US010263656B2

(12) United States Patent
Fathollahi et al.

(10) Patent No.: US 10,263,656 B2
(45) Date of Patent: *Apr. 16, 2019

(54) MULTI-CHANNEL MIXING CONSOLE

(71) Applicant: Zagg Amplified, Inc., Midvale, UT (US)

(72) Inventors: Andy Fathollahi, Corona Del Mar, CA (US); John Craig Cheney, Orem, UT (US); Bryan Richard Berrett, Highland, UT (US)

(73) Assignee: ZAGG Amplified, Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,151

(22) Filed: May 29, 2018

(65) Prior Publication Data
US 2018/0278285 A1    Sep. 27, 2018

Related U.S. Application Data

(63) Continuation of application No. 15/174,963, filed on Jun. 6, 2016, now Pat. No. 9,985,676.

(60) Provisional application No. 62/172,031, filed on Jun. 5, 2015.

(51) Int. Cl.
*H04B 1/3827* (2015.01)
*G06F 3/16* (2006.01)
*H04H 60/04* (2008.01)

(52) U.S. Cl.
CPC .......... *H04B 1/3833* (2013.01); *G06F 3/162* (2013.01); *H04H 60/04* (2013.01)

(58) Field of Classification Search
CPC .......... G06F 3/16; G06F 3/165; H04H 60/04; H04H 60/73; H04S 1/007; H04S 2400/05; H04S 2400/13; H04S 7/307
See application file for complete search history.

(56) References Cited

U.S. PATENT DOCUMENTS

| 8,068,105 | B1 * | 11/2011 | Classen | G06T 11/206 345/440 |
| 8,073,160 | B1 * | 12/2011 | Classen | G11B 27/034 381/119 |
| 8,768,252 | B2 * | 7/2014 | Watson | H04R 5/02 381/300 |
| 8,886,344 | B2 * | 11/2014 | Radford | H04H 60/04 700/94 |
| 9,411,882 | B2 * | 8/2016 | Cory | H04S 7/30 |
| 2003/0007648 | A1 * | 1/2003 | Currell | H04S 7/30 381/61 |

(Continued)

*Primary Examiner* — Mohammad K Islam
(74) *Attorney, Agent, or Firm* — Durham Jones & Pinegar; Sarah W. Matthews

(57) ABSTRACT

A battery powered, portable multi-channel audio mixing console is disclosed. The mixing console is configured to be easily held in a user's hand like a remote control. The console is configured to wirelessly receive, via separate channels, two or more independent stereo input audio signals from separate audio sources such as cellular phones, iPads, iPods, or other computing or media player devices, independently equalize the frequencies of those input signals, independently adjust the volume of those input signals, and then mix those audio signals into a combined output signal. The console further includes user controls that can vary the relative magnitude of the first and second input signals in the combined output signal. The console is further adapted to transmit the combined output signal to one or more speakers via independent channels.

18 Claims, 6 Drawing Sheets

(56) References Cited

U.S. PATENT DOCUMENTS

| | | | | |
|---|---|---|---|---|
| 2003/0138117 A1* | 7/2003 | Goff | ............... | H03G 5/165 381/103 |
| 2007/0195975 A1* | 8/2007 | Cotton | ............... | H04S 7/40 381/104 |
| 2007/0269062 A1* | 11/2007 | Rodigast | ............... | H04R 1/403 381/310 |
| 2010/0150359 A1* | 6/2010 | KnicKrehm | ............... | G01H 7/00 381/58 |
| 2012/0059492 A1* | 3/2012 | Radford | ............... | H04H 60/04 700/94 |
| 2012/0087503 A1* | 4/2012 | Watson | ............... | H04S 3/008 381/23 |
| 2012/0284622 A1* | 11/2012 | Avery | ............... | G06F 3/0488 715/719 |
| 2012/0288121 A1* | 11/2012 | Matsui | ............... | H03G 3/3089 381/107 |
| 2013/0262687 A1* | 10/2013 | Avery | ............... | G06F 9/54 709/229 |
| 2014/0029767 A1* | 1/2014 | Jarvinen | ............... | H04B 1/3833 381/119 |
| 2014/0133683 A1* | 5/2014 | Robinson | ............... | H04S 3/008 381/303 |
| 2014/0254820 A1* | 9/2014 | Gardenfors | ............... | H04R 3/005 381/80 |
| 2014/0328485 A1* | 11/2014 | Saulters | ............... | G06F 3/165 381/17 |
| 2015/0018993 A1* | 1/2015 | Trivedi | ............... | G11B 27/28 700/94 |
| 2015/0025664 A1* | 1/2015 | Cory | ............... | H04S 7/30 700/94 |
| 2016/0094301 A1* | 3/2016 | Terada | ............... | H04H 60/04 381/119 |
| 2016/0127062 A1* | 5/2016 | Chavez | ............... | H04R 3/00 381/119 |
| 2016/0371051 A1* | 12/2016 | Rowe | ............... | H04H 60/04 |

* cited by examiner

# MULTI-CHANNEL MIXING CONSOLE

RELATED APPLICATIONS

This application is a continuation of U.S. application Ser. No. 15/174,963, titled "MULTI-CHANNEL MIXING CONSOLE" filed Jun. 6, 2016, which claims the benefit of priority to U.S. provisional Patent Application No. 62/172,031, titled "MULTI-CHANNEL MIXING CONSOLE" and filed Jun. 5, 2015. The above application is hereby incorporated herein by reference in its entirety and is to be considered a part of this specification.

FIELD

This patent application generally relates to an audio mixer, and more specifically to portable multi-channel mixing console.

BACKGROUND INFORMATION

Audio mixers are electronic device for combining (or "mixing"), routing, or changing the loudness, timbre and/or dynamics of audio signals. The modified signals (voltages or digital samples) are summed to produce a combined output signal.

Conventional mixers are typically bulky, require external power, and are not readily portable. Moreover, they are often not capable of receiving, processing, and transmitting multiple wireless audio signals.

Accordingly, a need is recognized here for a compact and easily portable wireless audio mixing console that is particularly adapted for friend and family gatherings, travel, and leisure.

SUMMARY

The subject matter of this disclosure is generally directed to multi-channel audio mixing consoles and more specifically discloses a portable, hand-held, battery powered, wireless, stereo multi-channel audio mixing console and various aspects or features thereof.

The mixing console comprises a housing that is configured to be easily held in a user's hand, like a remote control. It is configured to wirelessly receive two or more independent stereo input audio signals from separate audio sources (i.e., separate channels) such as cellular phones, iPads, iPods, or other computing or media player devices, independently tune the frequencies of those input signals, independently adjust the relative volume of those input signals, and then mix those audio signals into left and right mixed output signals. The console further includes user controls that can vary the relative magnitude of the left and right output signals. The console is further adapted to transmit the mixed signals to one or more speakers via independent channels.

Each of the foregoing various aspects, together with those set forth in the claims, described in the drawings and written description provided or otherwise disclosed in this patent document may be combined to form claims for a device, apparatus, system, methods of manufacture and/or use in any way disclosed herein without limitation.

BRIEF DESCRIPTION OF THE DRAWINGS

These and other features, aspects and advantages, as structure, operation, and manufacture are described below with reference to the drawings, in which like reference numerals refer to like parts throughout. Though components in the figures are often illustrated to scale, emphasis of these drawings instead should be placed upon illustrating the principles of the various inventive aspects disclosed herein. Moreover, all illustrations are intended to convey concepts, where relative sizes, shapes and other detailed attributes may be illustrated schematically rather than literally or precisely.

DETAILED DESCRIPTION OF EMBODIMENTS

As illustrated in FIGS. 1A-3, the representative multi-channel audio mixing console 100 includes top, bottom, left, right, front, and rear sides 110, 112, 106, 108, 102, 104, respectively, and is comprised of a relatively rigid housing or enclosure 120 that contains the electronics, rechargeable battery, wireless modules and various interfaces. In the illustrated embodiment the housing is sized so that it can be easily held in one or two hands of the user.

Figure 3:
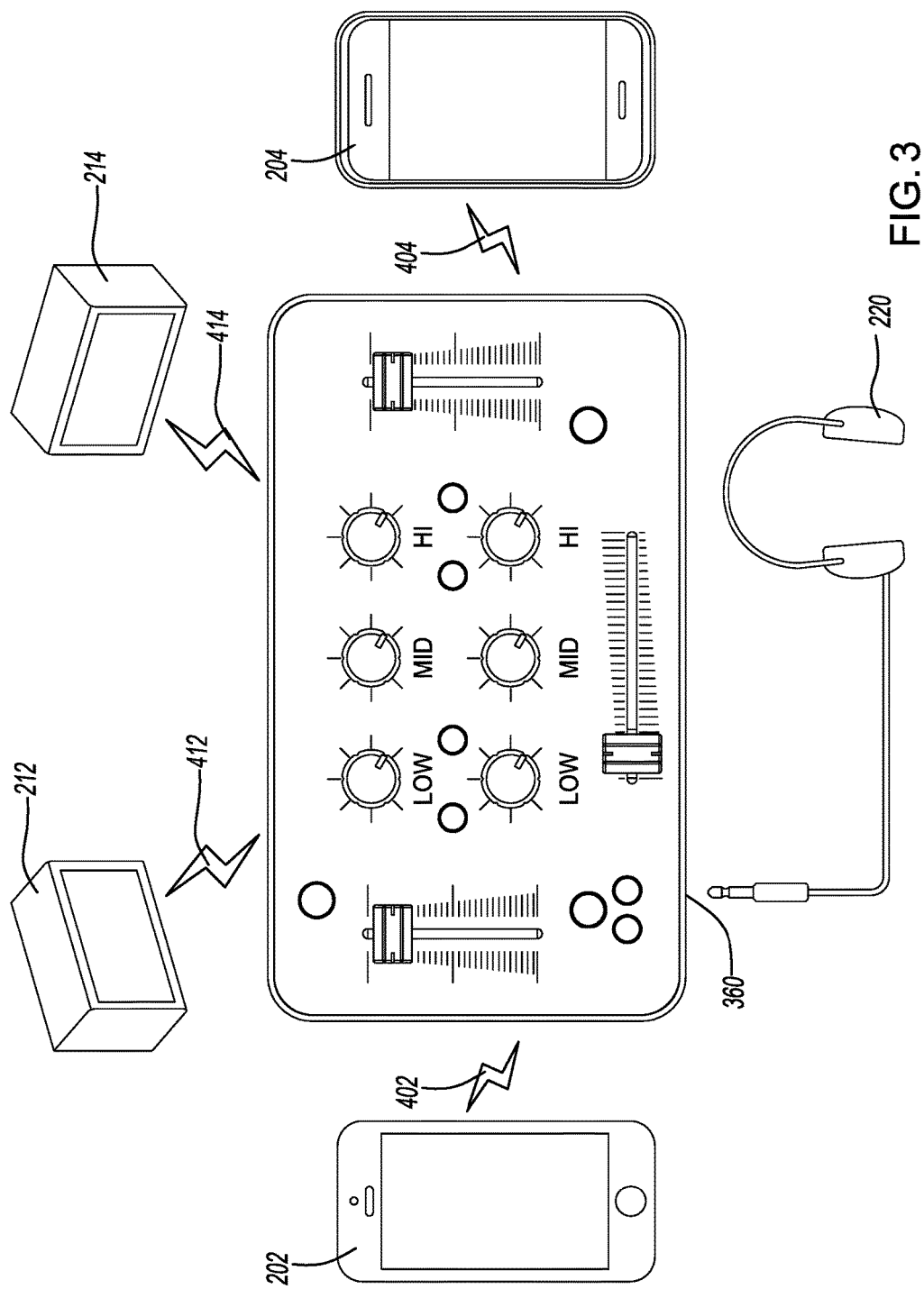
FIG. 3 is a schematic diagram illustrating the Bluetooth communication connections between the multi-channel mixing console illustrated in FIG. 1A and the input sources (depicted on the right and left) and the output sources (e.g., the speakers depicted on the top). Also depicted is a headphone and jack that can be connected directly to the console to allow the user to monitor the output of each channel.
Figure 4:
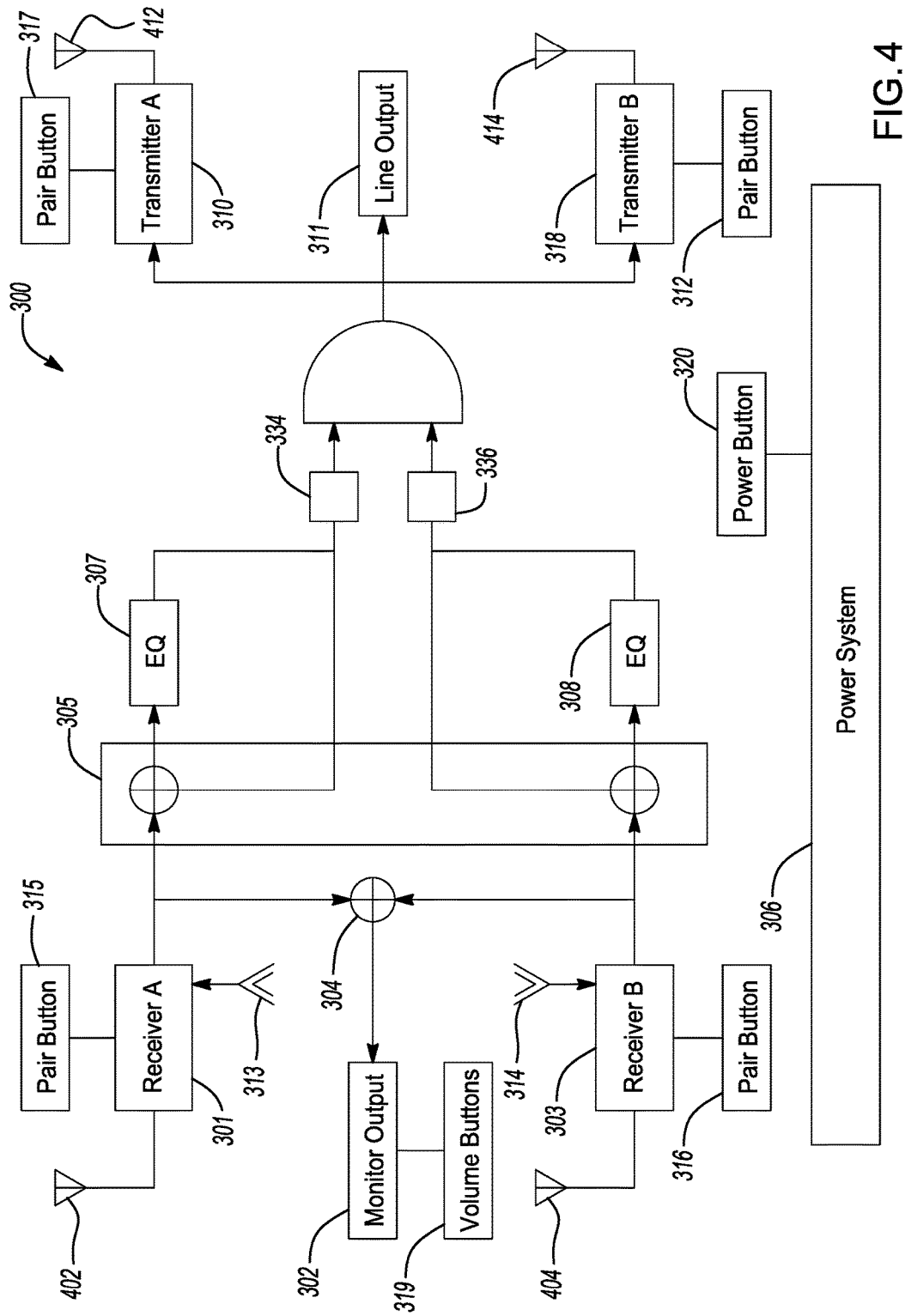
FIG. 4 is a block diagram illustrating representative electronic circuitry components housed within the internal enclosure of the multi-channel mixing console depicted in FIG. 1A.
Figure 5:
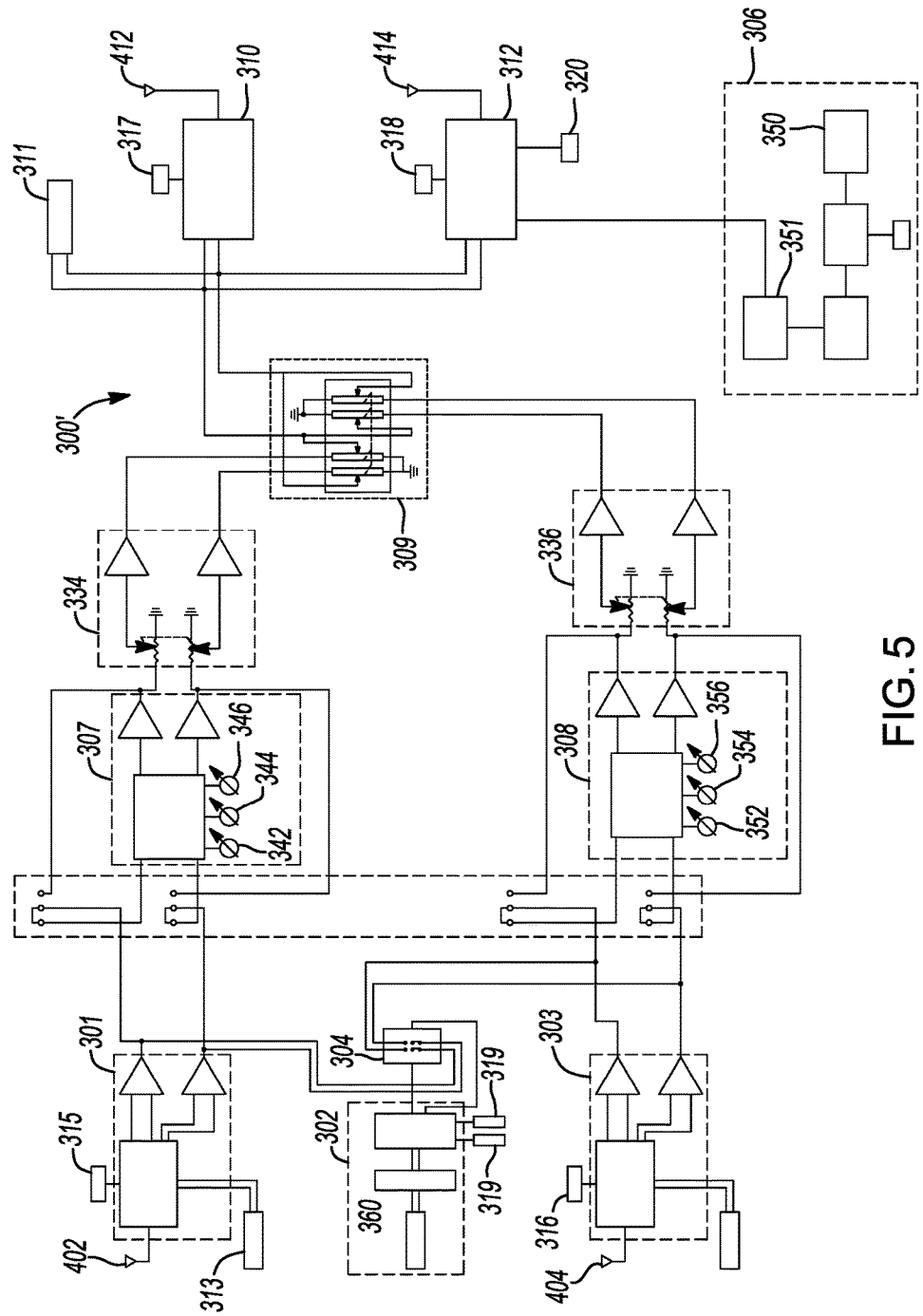
FIG. 5 is a representative electronic circuitry corresponding to the block diagram of FIG. 4.

As best illustrated in FIGS. 3-5, the audio mixing console 100 includes multiple Bluetooth® interfaces configured to receive audio signals from multiple audio sources, 202, 204 and transmit audio signals to multiple receivers such as Bluetooth® speakers or amplifiers, 212, 214. In one embodiment, the audio mixing console 100 is configured to receive two separate Bluetooth input signals 402, 404 as well as transmit two independent Bluetooth signals 412, 414. Therefore, audio information can be received from two separate sources and can be streamed to or played on two separate audio receiving devices (e.g., speakers).

As best illustrated in FIGS. 3-5, the audio mixing console 100 is configured to receive two Bluetooth input audio signals 402, 404 from audio sources 202, 204, respectively, and transmit two Bluetooth output audio signals 412, 414 to speakers 212, 214, respectively. In the embodiment illustrated in FIG. 3, the audio sources 202, 204 are cellular phones, however they can be any device capable of transmitting audio signals such as an iPad® or other tablet, iPod® or other digital media player or gaming device. The speakers 212, 214 can be any wireless speakers whether part of a larger component system or a stand-alone speaker, such as for example Braven® 570 Portable Bluetooth Speaker. One or more of the receivers may alternatively be a Bluetooth enabled amplifier that is in turn connected to another speaker or audio output system. While the system here illustrated includes two Bluetooth inputs and two Bluetooth outputs, it should also be understood that the system or console 100 can readily be scaled to allow for any number (e.g., 3, 4, 5, 6, etc.) of Bluetooth inputs and outputs.

Buttons 315, 316, 317, 318 (best illustrated in FIG. 1B) are provided to initiate pairing of the Bluetooth interfaces of the audio mixing console 100 with the Bluetooth interfaces of the external devices 202, 204, 212, 214, respectively, to establish a Bluetooth connection.

Figure 1A:
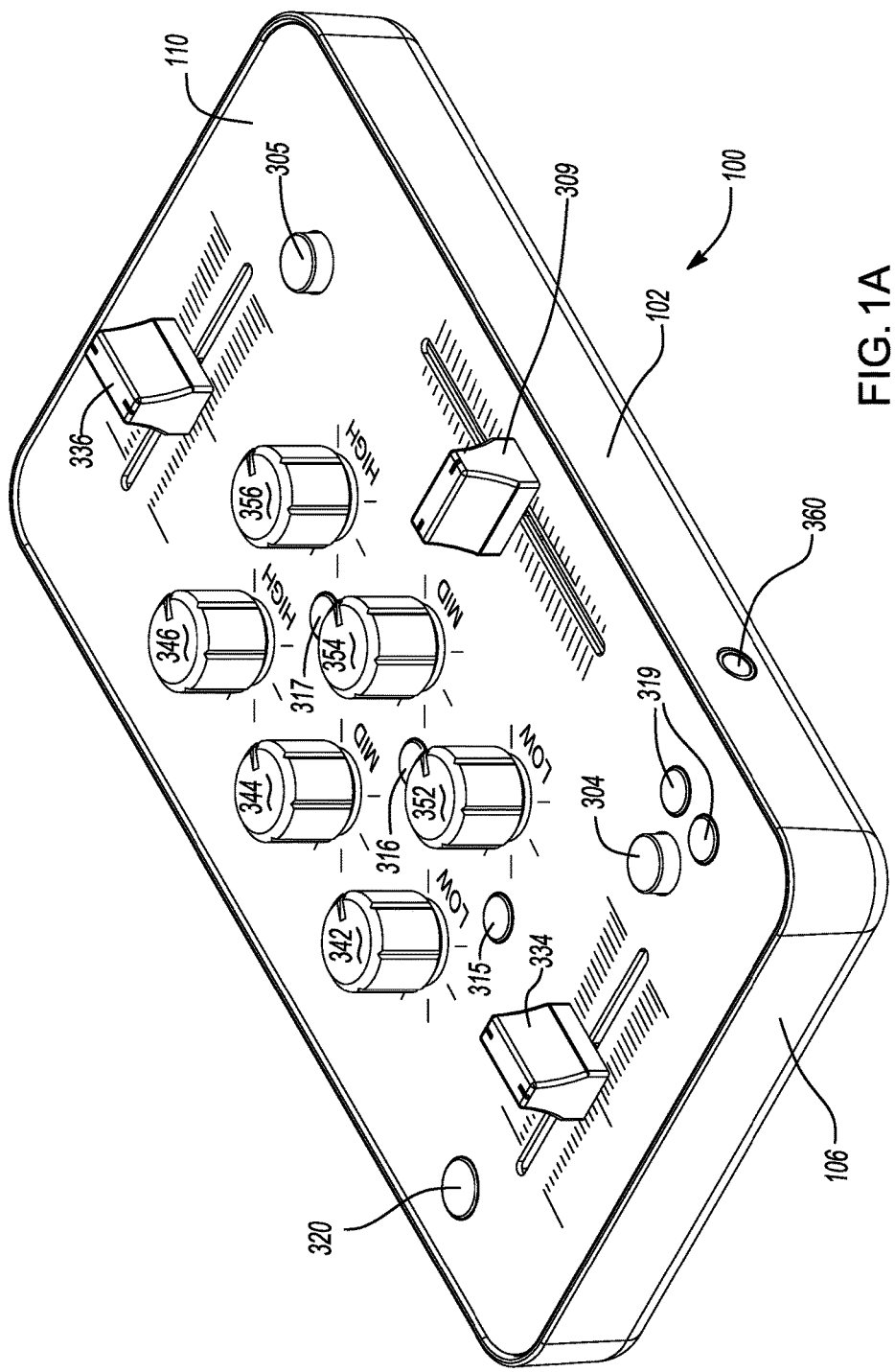
FIG. 1A is a perspective view of a representative multi-channel mixing console in accordance with the teachings herein.
Figure 1B:
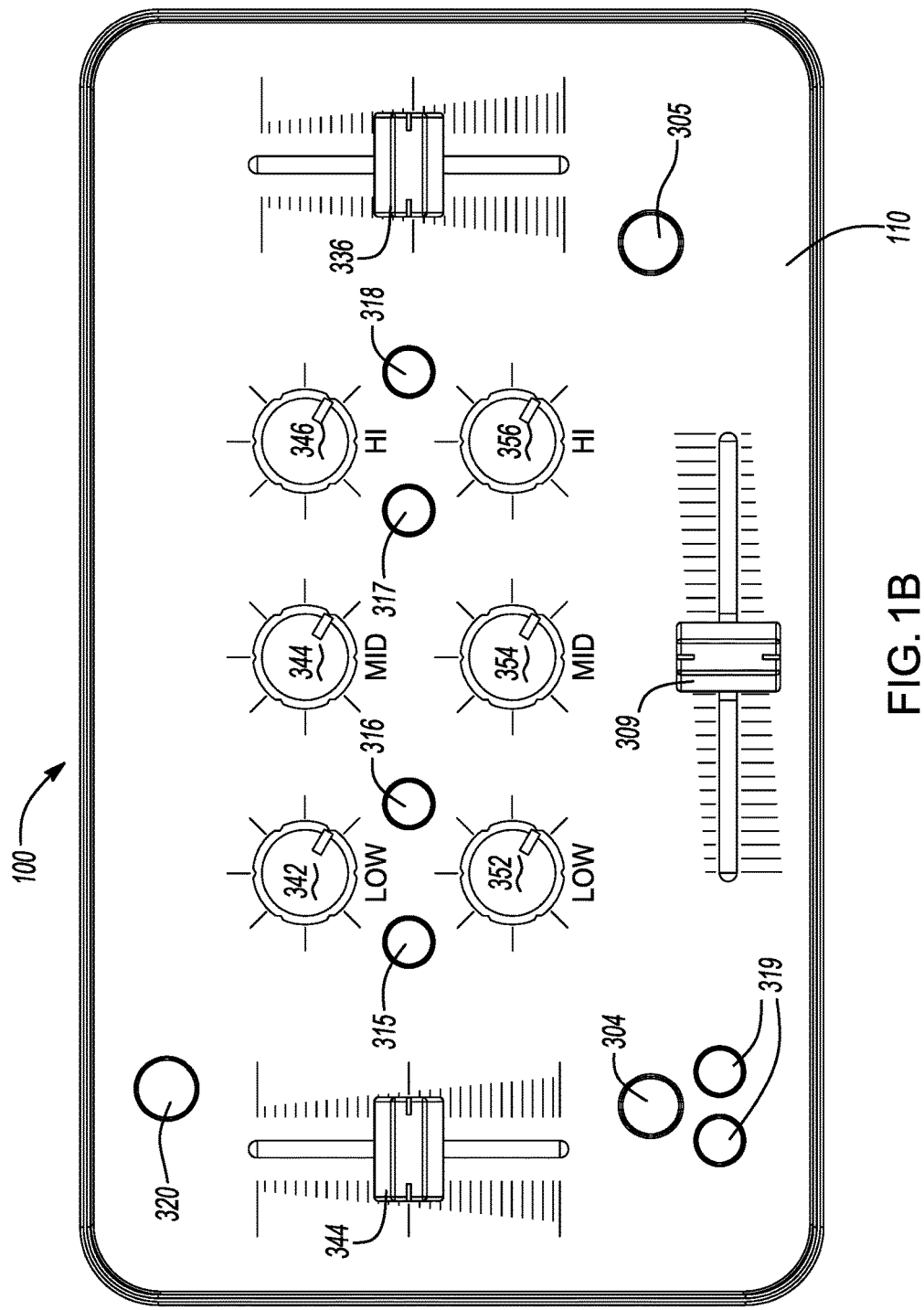
FIG. 1B is a front plan view of the multi-channel mixing console illustrated in FIG. 1A.
Figure 2:
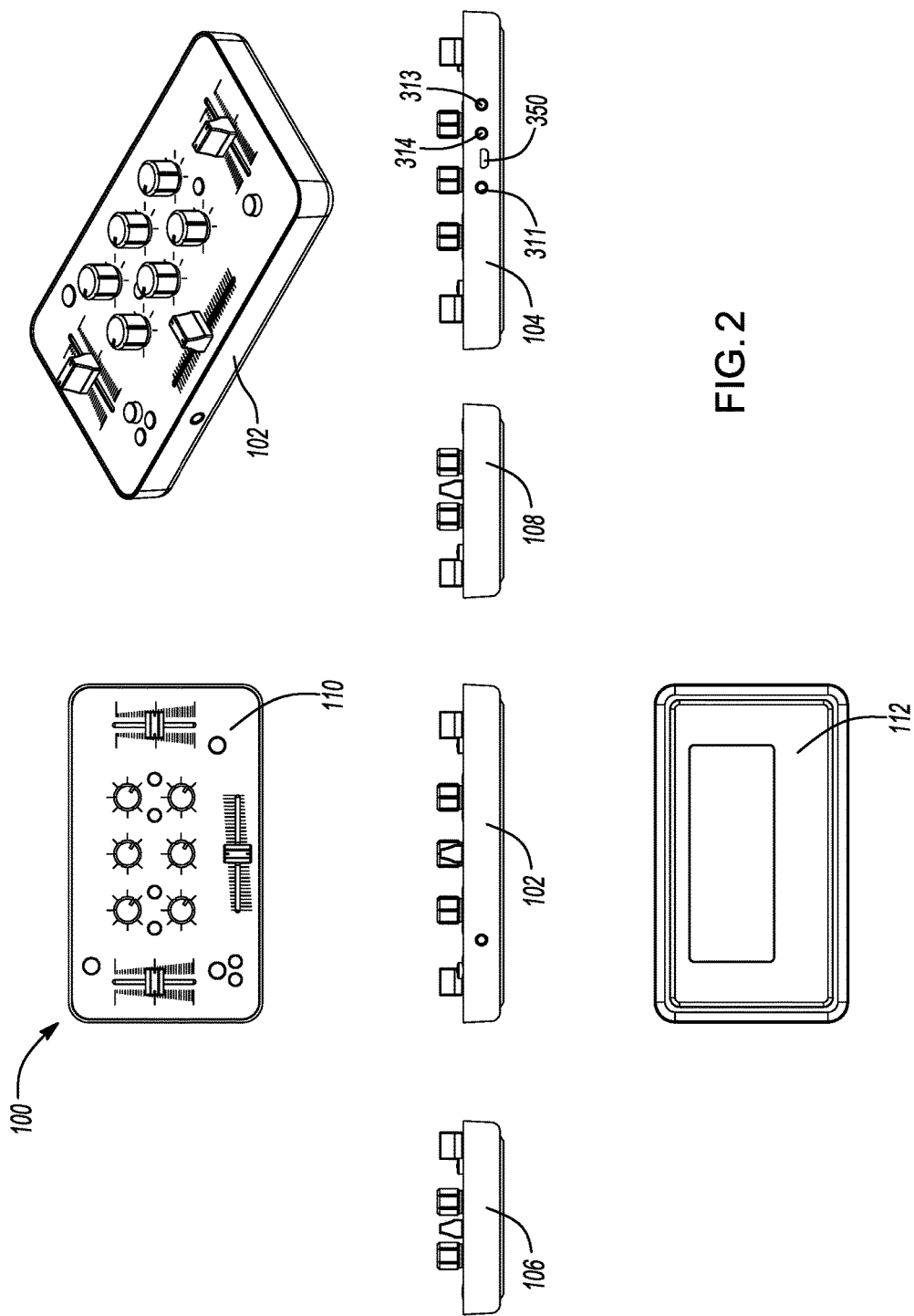
FIG. 2 is a compilation of perspective and plan views of the multi-channel mixing console illustrated in FIG. 1A.

Each of the Bluetooth input audio signals 402, 404 may be tuned with a set of frequency tuners located on the top side 110 of the audio mixing console 100. As illustrated in FIGS. 1A-1B, Bluetooth input audio signal 402 may be tuned by using a first equalizer 307 having low, mid, and high frequency tuners 342, 344, 346, while Bluetooth input audio signal 404 may be tuned by using a second equalizer 308 having low, mid, and high frequency tuners 352, 354, 356. An equalizer by-pass button 305 is provided that when depressed by the user routes the audio input signals around the frequency tuners.

The audio mixing console 100 also has individual volume controls 334, 336, which can adjust the volume of each signal prior to mixing by the mixer 309. In the present embodiment, the audio mixing console 100 is configured to have the volume control 334 on the left side of the top side corresponding to the volume control of a first Bluetooth audio signal 402 and the volume control 336 on the right side corresponding to the volume control of a second Bluetooth audio signal 404.

A sliding adjustable resistor mixer 309, which has a user control, is also provided to mix or mash the audio signals into left and right output signals that are then independently transmitted to one or more speaker outputs via the Bluetooth transmitters 310, 312 or transmitted directly to a standard output jack. The user control for the mixer 309, which is positioned on the top face 110 near the front side 102, allows the user to vary the output magnitude of the mixed signals relative to the left and right audio lines. Sliding the mixer 309 control toward the left side 106 will increase the relative magnitude of the mixed signal being outputted to the left line and sliding the mixer 309 output control to the right side 108 will increase the relative magnitude of the mixed signal to the right line. Positioning the mixer 309 output control in the middle will not bias the outputted signals, but rather transmit the mixed output signals in equal magnitude to both the left and right lines. The speaker receiving the left and right line signals will then generate stereo sound in accordance with the magnitude of the left and right line audio signals outputted from the mixer 309 and fed into the left and right individual speakers contained in the speaker unit 212 and/or 214. In this way the user can selectively control the relative volume or output of the left and right speaker of a stereo speaker unit 212 and/or 214.

As best illustrated in FIGS. 4 and 5, in another embodiment, sliding adjustable resistor mixer 309 may be configured to adjust volume between two input signals (e.g., the first input signal received from first audio source 402 and the second input signal received from second audio source 404) and mix the two input signals into a single Bluetooth signal that can be sent to one or more separate speakers via the Bluetooth transmitters 310, 312 or transmitted directly to a monitor output 360. The mixer 309 allows the user to vary the output magnitude of the first and second input signals relative to each other. Sliding the mixer 309 control toward the left side 106 will increase the relative magnitude of the first input signal and sliding the mixer 309 control to the right side 108 will increase the relative magnitude of the second input signal. Positioning the mixer 309 output control in the middle will not bias the outputted signals, but rather transmit the first and second input signals in equal magnitude. The speaker or speakers receiving the Bluetooth signal(s) will then generate sound in accordance with the relative magnitude of the first and second input signals as outputted from the mixer 309. In this way the user can crossfade between two input signals with one or more speaker units 212 and/or 214. Users can play audio from multiple audio sources 402, 404 through a single speaker 212 without needing to repeatedly pair and unpair devices.

As best shown in FIGS. 4 and 5, in another embodiment, the multi-channel audio mixing console may process the first signal received from first external audio device 202 entirely separately from the second signal received from second external audio device 204 until the two signals are combined by the mixer 309. The first signal received at the first Bluetooth input received 301 from first external audio device 202 (either through Bluetooth input signal 402 or analog input signal 313) is modified by first equalizer 307 and first volume control 334. The second signal received at the second Bluetooth input received 303 from first external audio device 204 (either through Bluetooth input signal 404 or analog input signal 314) is modified by second equalizer 308 and second volume control 336. After the first and second signal are independently equalized and volume adjusted, the first signal from the first external audio device 202 and the second signal from the second external audio device 204 are combined by mixer 309, producing a combined audio signal. The same combined audio signal may then be routed to Bluetooth transmitter A 310, Bluetooth transmitter B 312, and line output 311. In this embodiment, first speaker 212 and second speaker 214 both generate audio based on the same combined audio signal.

A headphone-out switch button 304 is provided for listening between audio sources 202, 204. In another embodiment, as best illustrated in FIG. 5, headphone-out switch 304 may switch the signal to monitor output 360 between audio source 202 and audio source 204.

Referring in more detail to FIGS. 4-5 for further descriptions of the audio mixing console 100. Specifically, FIG. 4 is a block diagram of a representative circuit 300 housed within the internal enclosure of the audio mixing console 100 depicted in FIGS. 1A-1B. FIG. 5 is a representative circuit schematic diagram corresponding to FIG. 4.

The audio mixing console 100 has two audio input receivers 301, 303. Each of the audio input channels has two input sources. The first audio input receiver 301 can receive audio input from a first Bluetooth source 402 or a first analog line input source 313. The second audio input receiver 303 can receive audio input from a second Bluetooth source 404 or a second analog line input source 314.

In order for the audio input receivers 301, 303 to receive audio inputs from Bluetooth sources 402, 404, the audio input receivers 301, 303 have to be paired with external devices 202, 204 with Bluetooth communication capability. The user can press the pair button 315 to pair the external audio device 202 with the first audio input receiver 301. Similarly, the user can press the pair button 316 to pair the external audio device 204 with the second audio input receiver 303.

In the present embodiment, an analog source present on any of the line inputs 313, 314 has priority over the Bluetooth sources 402, 404 connected to the same receiver. It should be understood however that the circuitry could be configured to prioritize the Bluetooth sources 402, 404.

The monitor output 360 is configured to allow the user to monitor the outputs from audio input receivers 301, 303 (i.e., each of the channels). Button 304 selects which channel is being monitored. The outputs from audio input receivers 301, 303 can be monitored from monitor output 360 and be heard by a user through a suitable speaker device such as a headphone 220. The volume of monitor output 360 can be controlled by volume buttons 319.

Two equalizers 307, 308 are configured to allow the user to apply individual equalization effects to the output of each of the receivers 301, 303. In the present embodiment, analog knobs 342, 344, 346 are used to tune the low, middle and high frequencies, respectively, for the output of the first audio input receiver 301. Similarly, analog knobs 352, 354, 356 are used to tune the low, middle and high frequencies, respectively, for the output of the second audio input receiver 303. The outputs from equalizers 307, 308 become the inputs to the mixer 309.

The equalization effects can be bypassed if desired by depressing button 305, which routes the outputs of receivers 301, 303 around their respective equalizers 307, 308 and directly to their respective volume control 334, 336. For example, when the EQ button 305 is released, the user set equalization effects will be applied to the signals, while when the EQ button 305 is pressed, the output of each of the receivers 301, 303 will bypass the equalizers 307, 308 and be sent directly to respective volume controls 334, 336 that feed and then passed to mixer 309. The volume controls 334, 336 independently adjust the volume of each source channel before the source channels are mixed.

The EQ button 305 can be made of transparent or semi-transparent material so that when the button 305 is released, it can also trigger a light source (e.g., LED) under the button to illuminate the button 305 for indication purpose.

The first volume control 334 is configured to control the volume of the output audio signals (left and right) from the first equalizer 307 (or from the first receiver 301 if the equalization effect is cancelled) while the second volume control 336 is configured to control the volume of the output audio signals (left and right) from the second equalizer 308 (or from the second receiver 303 if the equalization effect is cancelled).

Output signals from the first volume control 334 and the second volume control 336 can be mixed by the mixer 309. The mixed signals are then routed to the first and second transmitters 310, 312. The mixed signal can also be sent to a line output 311. The user control in the form of a slider, allows the user to control the relative magnitude of the left and right lines of the mixed signals as previously described above. The slider mixer 309 may instead allow a user to control the relative magnitude of the first input and second input as previously described above and illustrated in FIGS. 4 and 5.

In order for the transmitters 310, 312 to transmit Bluetooth signals 412, 414 to external Bluetooth audio receivers (e.g., speakers 212, 214), the transmitter 310, 312 have to be paired with the external audio sinks with Bluetooth communication capability. The user can press the pair button 317 to pair the external audio device 212 with the first transmitter 310. Similarly, the user can press the pair button 318 to pair the external audio device 214 with the second transmitter 312.

The system can have the option of being powered by a USB 5V input 350 or for greater portability it may be powered by the internal rechargeable battery 351 contained within the Power System 306. System power can be turned on and off via an external user accessible Power Switch 320.

The diagrams in FIGS. 4 and 5 are only representative of an implementing circuit. Other circuits may also be designed to effectuate the same or similar user functionality.

The audio mixing console 100 described herein can also be hard-wired to non-Bluetooth speakers or audio sources using multiple line-in and line-out jacks. In one embodiment, when Bluetooth is not available, there are two audio inputs as well as an audio output to a speaker, or an output to headphones.

While the disclosure has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

The invention claimed is:

1. A multi-channel audio mixing console comprising: a housing; a battery contained within the housing; an electronic circuit contained within the housing and configured to wirelessly receive a first input audio signal from a first audio source and to wirelessly receive a second input audio signal from a second audio source; a first equalizer user interface configured to equalize a first volume adjusted audio signal to generate a first equalized audio signal; a second equalizer user interface configured to equalize a second volume adjusted audio signal to generate a second equalized audio signal; a mixer configured to combine the first equalized audio signal and the second equalized audio signal to generate a combined audio signal, the mixer comprising a mixer user interface configured to adjust the relative magnitude of the first equalized audio signal and the second equalized audio signal in the combined audio signal; and wherein the electronic circuit is further configured to wirelessly transmit the combined audio signal to an external device.

2. The multi-channel mixing console of claim 1, wherein the first audio source is a separate device from the second audio source.

3. The multi-channel mixing console of claim 1, wherein the electronic circuit wirelessly receives the first input audio signal and the second input audio signal and wirelessly transmits the combined audio signal via Bluetooth.

4. The multi-channel mixing console of claim 3, wherein the external device is an external speaker.

5. The multi-channel mixing console of claim 1, wherein the electronic circuit comprises at least 3 Bluetooth modules, each Bluetooth module being configured to maintain a separate, simultaneous Bluetooth connection.

6. The multi-channel mixing console of claim 5, wherein the electronic circuit is configured to maintain separate, simultaneous Bluetooth connections with the first audio source, the second audio source, and the external device.

7. The multi-channel mixing console of claim 5, wherein the electronic circuit is configured to maintain separate, simultaneous Bluetooth connections with at least two external speakers.

8. A portable hand-held, wireless, multi-channel audio mixing console adapted to receive at least two independent wireless input audio signals, mix said input audio signals, and transmit a combined output audio signal, the mixing console comprising:

a housing having a top surface;

a battery contained within the housing;

an electronic circuit contained within the housing and configured to wirelessly receive at least two independent input audio signals, the at least two independent input audio signals comprising at least a first input audio signal and a second input audio signal, and to combine the two independent input audio signals to generate and wirelessly transmit a combined output audio signal;

at least one volume control, the at least one volume control being configured to adjust the volume of at least one of the two independent input audio signals;

at least one equalizer, the at least one equalizer configured to equalize one of the at least two independent wireless input audio signals;

an actuator configured to route the input audio signal in a way to bypass the equalizer; and a mixer control, the mixer control being configured to adjust the relative magnitude of the first input audio signal and the second input audio signal in the combined output audio signal.

9. The portable multi-channel mixing console of claim 8, wherein the at least two independent input audio signals are Bluetooth signals.

10. The portable multi-channel mixing console of claim 8, wherein the at least two independent input audio signals are received from two separate audio sources.

11. The portable multi-channel mixing console of claim 8, wherein the combined audio signal is transmitted to an external speaker.

12. The portable multi-channel mixing console of claim 11, wherein the transmission to the external speaker is via a Bluetooth connection.

13. The portable multi-channel mixing console of claim 12, wherein the portable multi-channel mixing console is capable of simultaneously transmitting to more than one external speakers with more than one separate Bluetooth connection.

14. The portable multi-channel mixing console of claim 8, wherein the input audio signals are Bluetooth signals.

15. The portable multi-channel mixing console of claim 8, wherein the mixer control is a slider bar.

16. The portable multi-channel mixing console of claim 8, wherein each equalizer comprises a plurality of tuners.

17. The portable multi-channel mixing console of claim 8, wherein the volume control adjusts the volume of the input audio signal before the equalizer equalizes the input audio signal.

18. The portable multi-channel mixing console of claim 8, wherein the volume control adjusts the volume of the input audio signal and the equalizer equalizes the input audio signal before the mixer control adjusts the relative magnitude of the input audio signals.

* * * * *